United States Patent
Hagen et al.

(10) Patent No.: US 12,410,876 B2
(45) Date of Patent: *Sep. 9, 2025

(54) FLUID CONNECTION ASSEMBLY

(71) Applicant: Oetiker NY, Inc., Lancaster, NY (US)

(72) Inventors: Kristian James Hagen, Gasport, NY (US); Kari Ann Sausen, Clarence, NY (US); Ryan Zillig, Williamsville, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/555,937

(22) PCT Filed: Apr. 5, 2022

(86) PCT No.: PCT/US2022/071545
§ 371 (c)(1),
(2) Date: Oct. 18, 2023

(87) PCT Pub. No.: WO2022/256757
PCT Pub. Date: Dec. 8, 2022

(65) Prior Publication Data
US 2024/0200703 A1 Jun. 20, 2024

Related U.S. Application Data

(63) Continuation-in-part of application No. PCT/US2021/071953, filed on Oct. 21, 2021, and a
(Continued)

(51) Int. Cl.
*F16L 37/12* (2006.01)
*F16L 21/06* (2006.01)
(Continued)

(52) U.S. Cl.
CPC ......... *F16L 37/1225* (2013.01); *F16L 21/06* (2013.01); *F16L 23/04* (2013.01); *F16L 37/0885* (2019.08); *F16L 41/03* (2013.01)

(58) Field of Classification Search
CPC ....... F16L 23/04; F16L 21/06; F16L 37/1225; F16L 37/0885; F16L 41/03
See application file for complete search history.

(56) References Cited

U.S. PATENT DOCUMENTS

| 4,640,534 A | 2/1987 | Hoskins et al. |
| 4,753,458 A | 6/1988 | Case et al. |

(Continued)

FOREIGN PATENT DOCUMENTS

| CA | 2541226 A1 * | 11/2006 | ............. F16L 21/06 |
| CN | 202001747 U | 10/2011 | |

(Continued)

OTHER PUBLICATIONS

CN104884853A—Machine Translation—English (Year: 2015).*
KR-2019105345-A—Machine Translation—English (Year: 2019).*

*Primary Examiner* — William S. Choi
(74) *Attorney, Agent, or Firm* — Harter Secrest & Emery LLP; Michael Nicholas Vranjes

(57) ABSTRACT

A fluid connection assembly, including a connector body, including a first end, a second end, a through-bore, a first radially outward facing surface including an annular groove, a first radially inward facing surface extending from the first end, and a second radially inward facing surface extending from the second end, and a retainer operatively arranged to be removably connected to the connector body, the retainer including a third end, a fourth end, a first section, a second section displaceable with respect to the first section, a third radially inward facing surface, a first flange extending radially inward from the third radially inward facing surface and operatively arranged to engage the annular groove, and
(Continued)

a second flange extending radially inward from the third radially inward facing surface.

20 Claims, 4 Drawing Sheets

Related U.S. Application Data continuation-in-part of application No. PCT/US2021/035393, filed on Jun. 2, 2021.

(51) Int. Cl.
*F16L 23/04* (2006.01)
*F16L 37/088* (2006.01)
*F16L 41/03* (2006.01)

(56) References Cited

U.S. PATENT DOCUMENTS

| | | | |
|---|---|---|---|
| 5,297,818 A | 3/1994 | Klinger | |
| 5,459,500 A | 10/1995 | Klinger et al. | |
| 5,468,028 A | 11/1995 | Olson | |
| 5,472,242 A | 12/1995 | Petersen | |
| 5,584,411 A | 12/1996 | Channell et al. | |
| 5,647,612 A | 7/1997 | Yoshida et al. | |
| 5,681,061 A | 10/1997 | Olson | |
| 5,842,450 A | 12/1998 | Fort et al. | |
| 5,909,901 A | 6/1999 | Zillig et al. | |
| 5,979,946 A | 11/1999 | Petersen et al. | |
| 6,481,086 B1 | 11/2002 | Davidson | |
| 6,880,859 B2 | 4/2005 | Breay et al. | |
| 6,913,294 B2 | 7/2005 | Treverton et al. | |
| 7,128,347 B2 | 10/2006 | Kerin | |
| 7,240,930 B2 | 7/2007 | Stravitz | |
| 7,300,078 B2 | 11/2007 | Yamamoto et al. | |
| 7,364,207 B2 | 4/2008 | McGee et al. | |
| 7,497,477 B2 | 3/2009 | Pepe | |
| 7,631,905 B2 | 12/2009 | McGee et al. | |
| 7,802,822 B2 | 9/2010 | Poder et al. | |
| 7,828,338 B2 * | 11/2010 | Kertesz | F16L 37/1225 |
| 7,963,570 B2 | 6/2011 | Swift et al. | |
| 8,375,550 B2 | 2/2013 | Swift et al. | |
| 9,791,079 B2 * | 10/2017 | Considine, Jr. | |
| 10,221,976 B2 | 3/2019 | Kujawski et al. | |
| 10,273,996 B2 | 4/2019 | Whitaker et al. | |
| 10,281,075 B2 | 5/2019 | Hontz et al. | |
| 10,738,922 B2 * | 8/2020 | Rempert | F16L 23/04 |
| 10,738,926 B2 | 8/2020 | Stieler | |
| 10,781,958 B2 | 9/2020 | Fremont | |
| 11,092,269 B2 | 8/2021 | Kujawski, Jr. et al. | |
| 11,781,690 B2 | 10/2023 | Barthel et al. | |
| 2006/0289066 A1 * | 12/2006 | Lesage | F16L 41/03 |
| 2007/0132235 A1 * | 6/2007 | Catlow | |
| 2008/0111376 A1 | 5/2008 | Ferrero | |
| 2009/0091125 A1 | 4/2009 | Takeda et al. | |
| 2009/0119886 A1 | 5/2009 | Werth | |
| 2010/0032937 A1 | 2/2010 | Kerin et al. | |
| 2011/0006517 A1 | 1/2011 | Nakata | |
| 2011/0101674 A1 | 5/2011 | Benvenuto et al. | |
| 2012/0104746 A1 | 5/2012 | Fansler et al. | |
| 2014/0210202 A1 | 7/2014 | Hess et al. | |
| 2016/0363247 A1 | 12/2016 | McCure | |
| 2017/0114935 A1 | 4/2017 | Kujawski, Jr. et al. | |
| 2017/0254453 A1 | 9/2017 | Fremont et al. | |
| 2018/0328525 A1 | 11/2018 | Kerin, Jr. | |
| 2019/0063656 A1 | 2/2019 | Kujawski, Jr. | |
| 2019/0331275 A1 | 10/2019 | Kujawski, Jr. | |
| 2020/0166167 A1 | 5/2020 | Hagen et al. | |
| 2020/0191310 A1 | 6/2020 | Kim et al. | |
| 2022/0049731 A1 | 2/2022 | You | |

FOREIGN PATENT DOCUMENTS

| | | | | |
|---|---|---|---|---|
| CN | 104884853 | | 9/2015 | |
| CN | 111306388 A | | 6/2020 | |
| CN | 111594624 | | 8/2020 | |
| CN | 212251624 | | 12/2020 | |
| CN | 112648460 A | | 4/2021 | |
| CN | 113738983 A | | 12/2021 | |
| DE | 102011121828 A1 | | 6/2013 | |
| EP | 1939514 | | 7/2008 | |
| EP | 3361134 | | 8/2018 | |
| EP | 3430302 | | 4/2020 | |
| JP | H 08-277983 A | | 10/1996 | |
| JP | H10306889 A | | 11/1998 | |
| JP | 2007-182993 A | | 7/2007 | |
| JP | 2008-082463 A | | 4/2008 | |
| JP | 2008-520932 A | | 6/2008 | |
| JP | 2008-281190 A | | 11/2008 | |
| JP | 2009-103303 A | | 5/2009 | |
| JP | 2010-038365 A | | 2/2010 | |
| JP | 4703885 | | 6/2011 | |
| JP | 2013-534992 A | | 9/2013 | |
| JP | 2013242038 A | | 12/2013 | |
| JP | 5743765 | | 7/2015 | |
| JP | 2016-070434 A | | 5/2016 | |
| JP | 2017-096494 A | | 6/2017 | |
| JP | 2019-011862 A | | 1/2019 | |
| JP | 2019152324 A | | 9/2019 | |
| JP | 3225845 U | | 4/2020 | |
| JP | 2020-514635 A | | 5/2020 | |
| JP | 2020-530891 A | | 10/2020 | |
| JP | 2021001626 | | 1/2021 | |
| JP | 2021-191972 A | | 12/2021 | |
| KR | 2019105345 A | * | 9/2019 | F16L 21/06 |
| KR | 10-2022-0025147 A | | 3/2022 | |
| WO | 2006-055668 A2 | | 5/2006 | |
| WO | 2018-127750 A1 | | 7/2018 | |

* cited by examiner

US 12,410,876 B2

1

FLUID CONNECTION ASSEMBLY

CROSS-REFERENCE TO RELATED APPLICATIONS

The present application is the U.S. National Stage Application pursuant to 35 U.S.C. § 371 of International Patent Application No. PCT/US2022/071545, filed on Apr. 5, 2022, which application claims the benefit under Articles 4 and 8 of the Stockholm Act of the Paris Convention for the Protection of Industrial Property of International Patent Application No. PCT/US2021/071953, filed on Oct. 21, 2021, and International Patent Application No. PCT/US2021/035393, filed on Jun. 2, 2021, which applications are hereby incorporated by reference herein in their entireties.

FIELD

The present disclosure relates to fluid connectors, and more particularly, to a fluid connection assembly for a refrigeration system including a connector body and a retainer that decreases the insertion force required for assembly and allows for quick assembly of components without the need for tools.

BACKGROUND

Fluid connectors, fluid connections, and fluid connection assemblies are integral components for many applications, and especially for automotive and industrial applications. Since refrigeration systems are made up of various components such as a compressor, air cooler, condenser, receiver, evaporator or chiller, and/or suction drum, fluid must be able to travel not only within each component but also between components. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, in order for the fluid connector to properly function, slots or apertures must be machined in the connector body such that the retaining clip can protrude therethrough and engage the tube, which requires extra post-process manufacturing. During the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process. Moreover, current connection assembly solutions do not indicate the connection state of the assembly.

Thus, there has been a long-felt need for a fluid connection assembly for a refrigeration system including a connector body and a retainer that allows for quick assembly, disassembly, eliminates the need for post-process machining, and reduces the insertion force required to assemble the fluid connector.

SUMMARY

According to aspects illustrated herein, there is provided a fluid connection assembly, comprising a connector body,

2 comprising a first end, a second end, a through-bore, a first radially outward facing surface comprising an annular groove, a first radially inward facing surface extending from the first end, and a second radially inward facing surface extending from the second end, and a retainer operatively arranged to be removably connected to the connector body, the retainer including a third end, a fourth end, a first section, a second section displaceable with respect to the first section, a third radially inward facing surface, a first flange extending radially inward from the third radially inward facing surface and operatively arranged to engage the annular groove, and a second flange extending radially inward from the third radially inward facing surface.

In some embodiments, the first radially inward facing surface comprises at least one annular groove. In some embodiments, the at least one annular groove comprises a first annular groove, and a second annular groove spaced apart in an axial direction from the first annular groove. In some embodiments, a seal is arranged in the at least one annular groove. In some embodiments, the second radially inward facing surface comprises threading. In some embodiments, the connector body further comprises a fourth radially inward facing surface arranged between first radially inward facing surface and the second radially inward facing surface, wherein the diameter of the fourth radially inward facing surface is less than both the first radially inward facing surface and the second radially inward facing surface. In some embodiments, the connector body further comprises an axial surface connecting the first radially inward facing surface and the fourth radially inward facing surface. In some embodiments, the connector body further comprises a frusto-conical surface connecting the second radially inward facing surface and the fourth radially inward facing surface.

In some embodiments, the first flange is arranged immediately proximate the third end, and the second flange is arranged immediately proximate the fourth end. In some embodiments, the first flange comprises a first diameter, the second flange comprises a second diameter, and the first diameter is greater than the second diameter. In some embodiments, the fluid connection assembly further comprises a tube including a shoulder, wherein the retainer is operatively arranged to secure the tube to the connector body. In some embodiments, the fluid connection assembly further comprises a service valve body comprising a plurality of ports, wherein the connector body is operatively arranged to be removably connected to at least one port of the plurality of ports.

According to aspects illustrated herein, there is provided a fluid connection assembly, comprising a connector body, comprising a first end, a second end, a through-bore extending from the first end to the second end, a first radially outward facing surface comprising an annular groove, a first radially inward facing surface extending from the first end, a second radially inward facing surface extending from the second end, and a third radially inward facing surface arranged between the first radially inward facing surface and the second radially inward facing surface, the third radially inward facing surface having a diameter that is less than the diameter of both the first radially inward facing surface and the second radially inward facing surface.

In some embodiments, the fluid connection assembly further comprises a retainer operatively arranged to be removably connected to the connector body, the retainer including a third end, a fourth end, a first section, a second section displaceable with respect to the first section, a fourth radially inward facing surface, a first flange extending radially inward from the fourth radially inward facing surface and operatively arranged to engage the annular groove, and a second flange extending radially inward from the fourth radially inward facing surface. In some embodiments, the first flange is arranged immediately proximate the third end, and the second flange is arranged immediately proximate the fourth end. In some embodiments, the first flange comprises a first diameter, the second flange comprises a second diameter, and the first diameter is greater than the second diameter. In some embodiments, the first radially inward facing surface comprises a first annular groove, and a second annular groove spaced apart in an axial direction from the first annular groove. In some embodiments, the second radially inward facing surface comprises threading. In some embodiments, the connector body further comprises an axial surface connecting the first radially inward facing surface and the third radially inward facing surface. In some embodiments, the connector body further comprises a frusto-conical surface connecting the second radially inward facing surface and the third radially inward facing surface.

According to aspects illustrated herein, there is provided a service port quick connect body that improves the ease of connection for industrial refrigerant applications, as well as eliminates the need for braze or solder joints. The present disclosure reduces the potential for operator induced quality failures and/or leaks, and the amount of time to connect a system.

The service port of the present disclosure comprises a quick connector body removably connectable thereto. For example, the quick connector body may be threadably engaged with the service port. The quick connector body comprises one or more O-rings and a flange to receive a plastic retainer. The tube bead abuts to the quick connect body flange and the retainer closes in on the bead and the quick connect body flange to retain the tube and prevent it from being removed. To service the system in the field, the retainer can be a replacement part provided by a service technician. Using a small pick/tool, the latch on the retainer is pried open.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
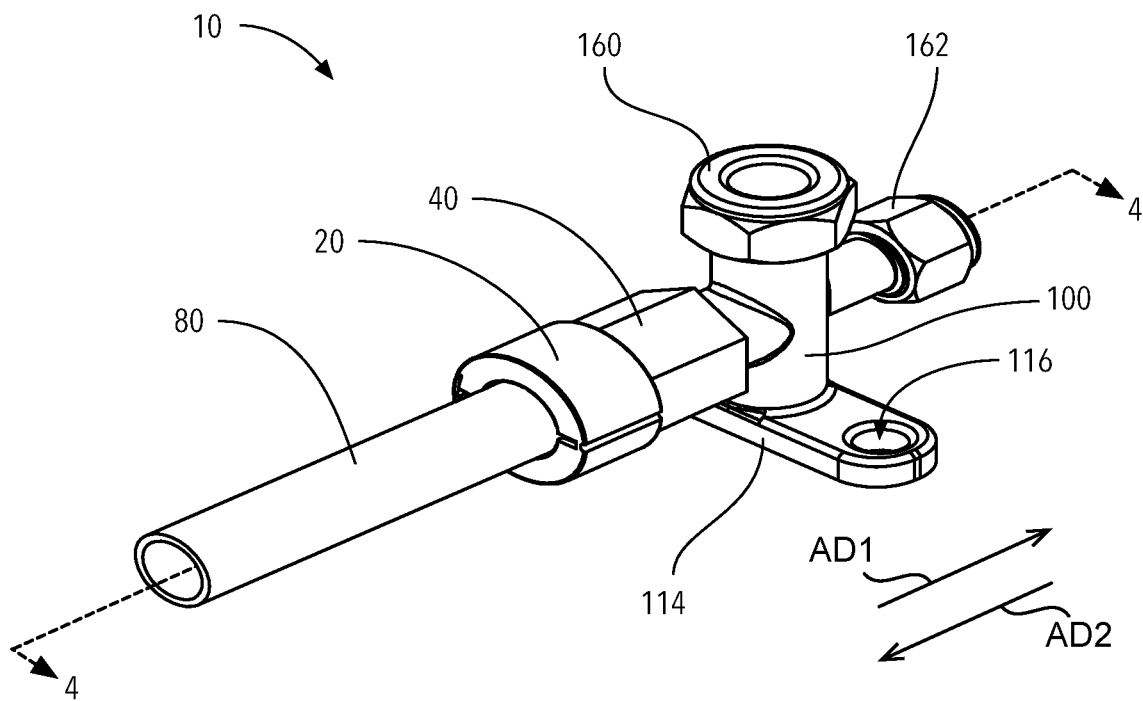
FIG. 1A is a front perspective view of a fluid connection assembly.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

"Fully assembled locked state" as used herein refers to the fluid connection assembly and indicates that the tube is fully connected to the service valve body and the retainer is fully connected to the service valve body to retain the tube therein. "Partially assembled locked state" as used herein refers to the fluid connection assembly and indicates that the retainer is fully connected to the service valve body but the tube is not arranged in the service valve body or the retainer. The retainer may also be described as having a "locked state" or an "unlocked state," which indicates the state of the retainer independent of the service valve body and the tube.

Figure 1B:
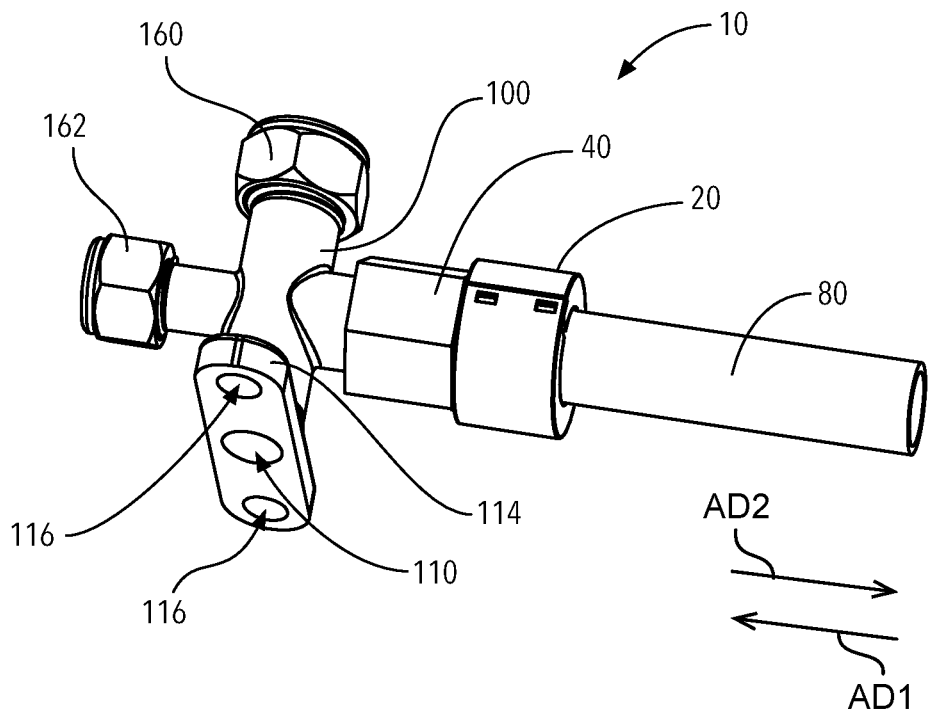
FIG. 1B is a rear perspective view of the fluid connection assembly shown in FIG. 1A.
Figure 2:
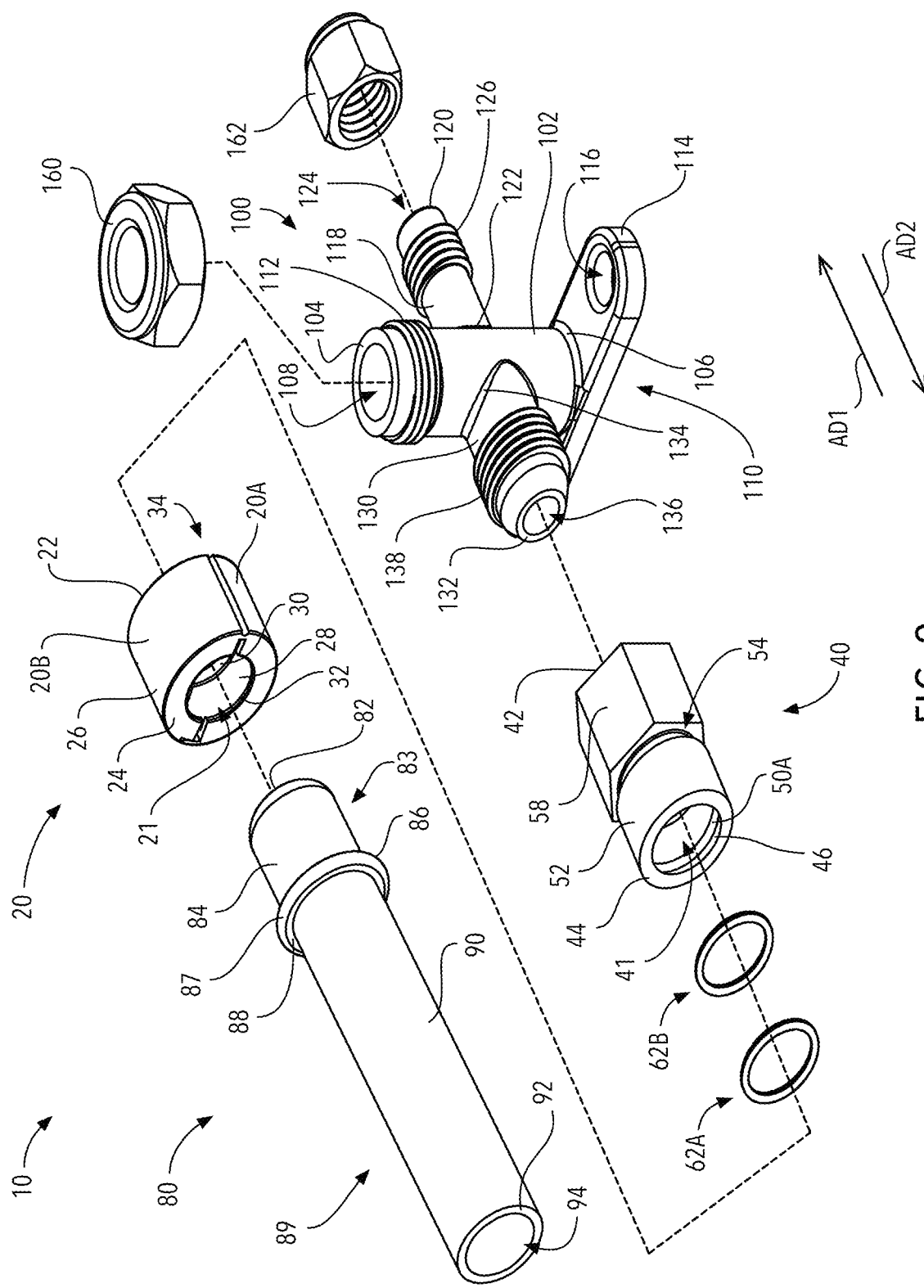
FIG. 2 is an exploded perspective view of the fluid connection assembly shown in FIG. 1A.

Adverting now to the figures, FIG. 1A is a front perspective view of fluid connection assembly 10. FIG. 1B is a rear perspective view of fluid connection assembly 10. FIG. 2 is an exploded perspective view of fluid connection assembly 10. Fluid connection assembly 10 generally comprises retainer 20, tube 80, connector body 40, and service valve body 100. The following description should be read in view of FIGS. 1A-2.

Tube 80 comprises end 82, section 83, bead or shoulder 87, section 89, end 82, and through-bore 94. Through-bore 94 extends through tube 80 from end 82 to end 92. Section 183 is arranged between end 82 and shoulder 87 and comprises radially outward facing surface 84. Radially outward facing surface 84 includes a substantially constant diameter. In some embodiments, radially outward facing surface 84 comprises a frusto-conical taper or curvilinear surface proximate end 82 (see FIG. 4). Shoulder 87 is arranged between section 83 and section 89 and comprises surface 86 and surface 88. In some embodiments, surface 86 is an axial surface facing at least partially in axial direction AD1 and surface 88 is an axial surface facing at least partially in axial direction AD2. In some embodiments, surface 86 is a frusto-conical surface extending from the radially outward facing surface of shoulder 87 radially inward in axial direction AD1. For example, surface 86 may be a linear conical shape and increase in diameter in axial direction AD2. In some embodiments, surface 86 may comprise a linear portion and a conical or frusto-conical portion. Section 89 is arranged between shoulder 87 and end 92 and comprises radially outward facing surface 90. Radially outward facing surface 90 includes a substantially constant diameter. Tube 80 is arranged to be inserted, specifically with end 82 first, into connector body 40. Tube 80 is inserted into connector body 40 until section 83, or radially outward facing surface 84, engages seals 62A-B (see FIG. 4). Shoulder 87 engages end 44, more specifically, surface 86 abuts against and/or engages end 44, at which point retainer 20 is assembled to secure tube 80 to service valve body 100, as will be described in greater detail below. It should be appreciated that tube 80 may be any traditional tube or tube end form comprising a bead, radially outward extending protrusion or flange, or ramp profile, which extends radially outward and axially on the outer surface of the tube, to secure the tube within the connector body. In some embodiments, tube 80 comprises a metal, a polymer, and/or a ceramic.

Figure 3:
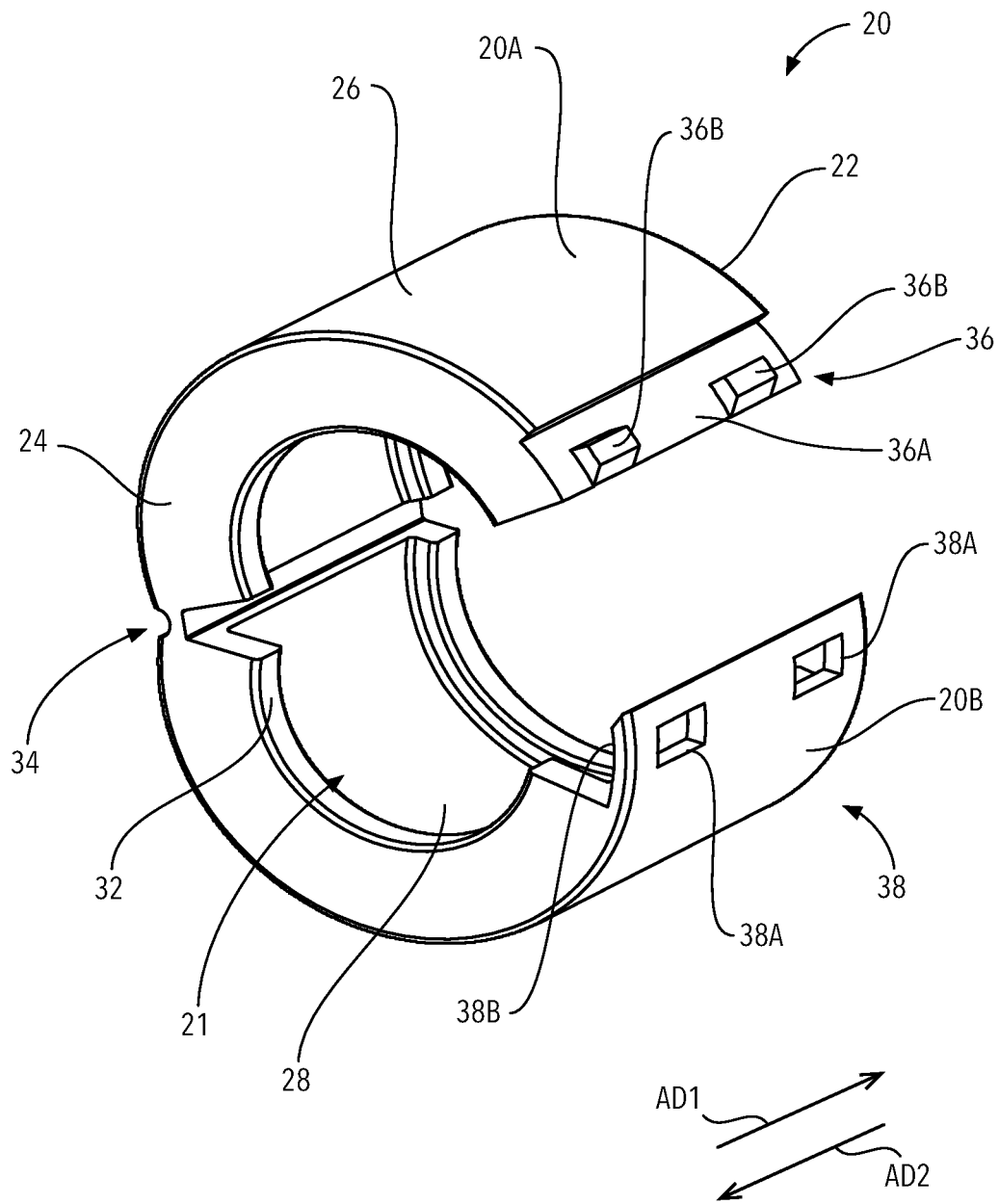
FIG. 3 is a perspective view of the retainer shown in FIG. 1A, in an unlocked state; and, FIG. 4 is a cross-sectional view of the fluid connection assembly taken generally along line 4-4 in FIG. 1A.
Figure 4:
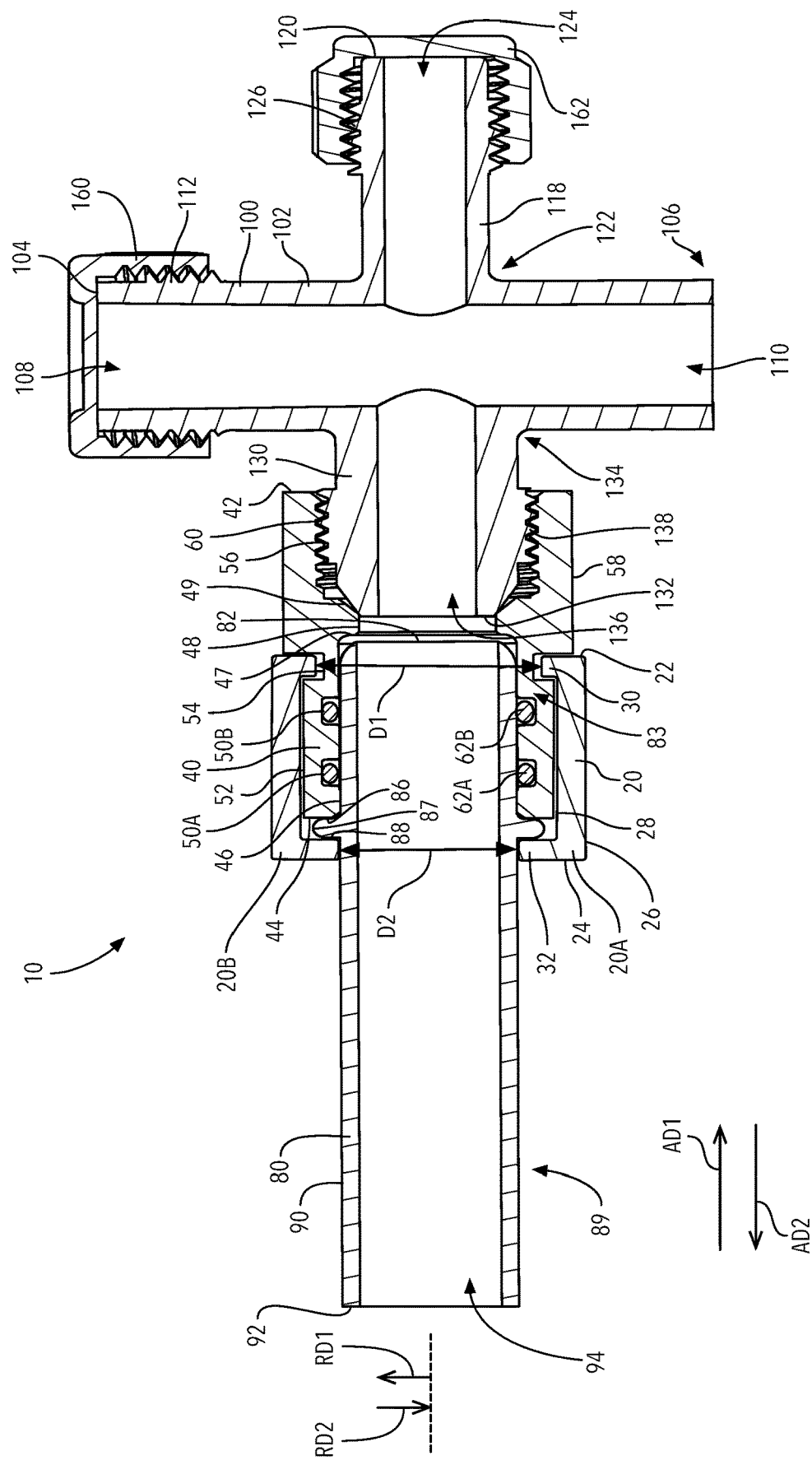

FIG. 3 is a perspective view of retainer 20, in an unlocked state. Retainer 20 is shown in FIGS. 1A-2 in a locked state. FIG. 4 is a cross-sectional view of fluid connection assembly 10 taken generally along line 4-4 in FIG. 1A. The following description should be read in view of FIGS. 1A-4.

Retainer 20 generally comprises section 20A, section 20B, end 22, end 24, hole 21 extending from end 22 to end 24, radially outward facing surface 26, and radially inward facing surface 28. In some embodiments, section 20A is hingedly connected to section 20B, via, for example, hinge 34. In some embodiments, hinge 34 is a living hinge. In some embodiments, section 20A is removably connected to section 20B. When sections 20A and 20B are connected or retainer 20 is in the locked state (FIGS. 1A-2), hole 21 is formed therebetween; however, it should be appreciated that even in the unlocked state (FIG. 3), it could be said that each of sections 20A and 20B include a respective hole 21.

Radially inward facing surface 28 extends from end 22 to end 24 and is operatively arranged to engage radially outward facing surface 52. Radially inward facing surface 28 comprises flange 30 extending radially inward therefrom. In some embodiments, flange 30 is arranged immediately adjacent end 22. Flange 30 is operatively arranged to engage groove 54 and radially inward facing surface 28 is operatively arranged to engage radially outward facing surface 52 to connect retainer 20 to connector body 40. Flange 30 comprises diameter D1. Radially inward facing surface 28 further comprises flange 32 extending radially inward therefrom. In some embodiments, flange 32 is arranged immediately adjacent end 24. Flange 32 is operatively arranged to engage shoulder 87 to connect tube 80 to connector body 40. Flange 32 comprises diameter D2. In some embodiments, diameter D1 is greater than diameter D2.

As best seen in FIG. 4, flange 32 is spaced apart from flange 30 by a first distance. Groove 54 is spaced apart from end 44 by a second distance. Shoulder 87 comprises a width equal to a third distance. The first distance is substantially equal to the sum of the second distance and the third distance. This design results in, when retainer 20 is connected to connector body 40 and tube 80, flange 32 abutting against surface 88, as well as surface 86 abutting against end 44 (i.e., retainer 20 clamps shoulder 87 to end 44). In some embodiments, the first distance is less than the sum of the second distance and the third distance. This results in shoulder 87 and connector body 40 being squeezed or clamped together. In some embodiments, the first distance is greater than the sum of the second distance and the third distance such that shoulder 87 is engaged or in close proximity with connector body 40. Additionally, flange 30 comprises a first width and groove 54 comprises a second width, the second width being greater than the first width. As such, when retainer 20 is connected to connector body 40 without tube 80 arranged therein, retainer 20 is capable of sliding or displacing in axial direction AD1 and axial direction AD2 with respect to connector body 40. When tube 80 is properly secured to connector body 40 by retainer 20, retainer 20 is not capable of displacing in axial direction AD1 and axial direction AD2 with respect to connector body 40. This feature provides an indicator as to the connection status of fluid connection assembly 10 and will be described in greater detail below. In some embodiments, the first width is substantially equal to the second width.

As previously described, flange 32 comprises diameter D2, which is less than the diameter of shoulder 87. This design prevents shoulder 87 from being removed from connector body 40, or tube 80 from displacing in axial direction AD2 or rotating (i.e., bending moment) relative to connector body 40. Tube 80 may still rotate in a circumferential direction with respect to connector body 40 and retainer 20.

Section 20A comprises male connector 36 and section 20B comprises female connector 38. As shown, male connector 36 on section 20A is arranged to engage female connector 38 on section 20B such that sections 20A and 20B are fixedly secured. In some embodiments, male connector 36 is hook-shaped (in a radially outward direction) and includes groove 36A and one or more radially outward extending projections 36B. Groove 36A is arranged in radially outward facing surface 26. Projections 36B extend generally radially outward in radial direction RD1 from groove 36A. In some embodiments, projections 36B comprise a tapered section near its radially outermost end operatively arranged to allow engagement of projections 36B with female connector 38, specifically, apertures 38A, to occur with greater ease.

Female connector 38 comprises one or more apertures 38A extending radially inward from radially outward facing surface 26. Apertures 38A are operatively arranged to engage projections 36B to lock section 20B to section 20A. Female connector 38 further comprises recess 38B. In some embodiments, recess 38B is arranged in radially inward facing surface 28 (i.e., extends radially outward from radially inward facing surface 28). As section 20B is displaced toward section 20A, female connector 38 engages projections 36B and displaces radially outward in radial direction RD1. Once apertures 38A are aligned with projections 36B, female connector 38 snaps back radially inward, in radial direction RD2, thereby securing section 20B to section 20A.

Service valve body 100 generally comprises section or tube 102, section or tube 118, and section or tube 130 to form a plurality of ports, for example, port 108, port 110, port 124, and port 136. Section 102, section 118, section 130 are connected such that all ports 108, 110, 124, and 136 are in fluid communication. Section 102 comprises end 104 forming port 108 and end 110 forming port 110. In some embodiments, and as shown, port 108 and port 110 are concentrically aligned. In some embodiments, port 108 is a service port and may comprise a valve stem or a stop collar (retainer) arranged therein. In some embodiments, section 102 comprises threading 112 on its radially outward facing surface proximate end 104. In some embodiments, cap 160 is threadably engaged with threading 112 to seal port 108. In some embodiments, port 110 is a middle port operatively arranged to be connected to a compressor or heat pump in a refrigeration system. In some embodiments, service valve body 100 comprises flange 114 connected to end 106. Flange 114 may comprise one or more through-holes 116 operatively arranged to secure service valve body 100 to another component (e.g., a compressor). In some embodiments, port 108 comprises a first diameter and port 110 comprises a second diameter, the second diameter being equal to the first diameter. In some embodiments, port 108 comprises a first diameter and port 110 comprises a second diameter, the second diameter being nonequal to the first diameter.

Section 118 comprises end 122 connected to section 102 and end 120 forming port 124. In some embodiments, port 124 may be a valve port and thus comprise a valve therein (e.g., a Schroeder valve). The valve in port 124 may control fluid flow within service valve body 100, for example, between ports 108, 110, and 136. In some embodiments, section 118 comprises threading 126 on its radially outward facing surface proximate end 120. In some embodiments, cap 162 is threadably engaged with threading 126 to seal port 124. In some embodiments, and as shown, port 124 is concentrically aligned with port 136. In some embodiments, section 118 is perpendicular to section 102. In some embodiments, section 118 is non-perpendicular to section 102.

Section 130 comprises end 134 connected to section 102 and end 132 forming port 136. In some embodiments, port 136 may be a line port and is operatively arranged to be connected to a component that is filled with fluid or through which fluid flows. For example, port 136 may be connected to a refrigerant line (i.e., tube 80). In some embodiments, section 130 comprises threading 138 on its radially outward facing surface proximate end 132. In some embodiments, connector body 40 is threadably engaged with threading 138, as will be described in greater detail below. In some embodiments, section 130 is perpendicular to section 102. In some embodiments, section 130 is non-perpendicular to section 102. In some embodiments, end 132 comprises a frusto-conical or curvilinear taper, wherein the diameter of the radially outward facing surface of section 130 decreases in axial direction AD2 (see FIG. 4). In some embodiments, port 124 comprises a first diameter and port 136 comprises a second diameter, the second diameter being greater than the first diameter. In some embodiments, port 124 comprises a first diameter and port 136 comprises a second diameter, the second diameter being less than or equal to the first diameter.

Connector body 40 comprises through-bore 41 extending from end 42 to end 44, radially inward facing surface 46, groove 50, radially outward facing surface 52, groove 54, head 58, and radially inward facing surface 56. Connector body 40 is arranged to be removably and sealingly connected to service valve body 100. Connector body 40 may be screwed onto a service valve body 100, specifically, by threadably engaging threading 60 on radially inward facing surface 56 with threading 138 of section 130. Connector body 40 may be screwed onto section 130 via head 58 (e.g., using a wrench). In some embodiments, head 58 is hexagonal; however, it should be appreciated that head 58 may comprise any geometry suitable for applying torque to connector body 40. It should be appreciated that fluid connection assembly 10 may be used in various components, assemblies, and subassemblies in which fluid connection is desired, for example, refrigeration systems or compressors, or a transmission.

End 42 is connected to section 130. Connector body 40 is arranged to be connected to a component that is filled with a fluid or through which fluid flows. For example, connector body 40 may be connected to a refrigerant line (i.e., tube 80). Seals 62A-B are arranged in connector body 40. Specifically, seal 62A-B are arranged in grooves 50A-B to engage tube 80 (i.e., radially outward facing surface 84). Grooves 50A-B are arranged spaced apart axially in radially inward facing surface 46. In some embodiments, seals 62A-B are O-rings. In some embodiments, connector body 40 only comprises one groove in its radially inward facing surface 46, and one seal arranged therein. In some embodiments, radially inward facing surface 46 is a substantially cylindrical surface. End 44 is operatively arranged to engage shoulder 87, specifically, to prevent axial displacement of tube 80 is axial direction AD1.

In some embodiments, and as shown, connector body 40 comprises radially inward facing surface 48, which comprises a diameter that is less than the diameter of radially inward facing surface 46. Radially inward facing surface 48 is connected radially inward facing surface 146 via surface 47. In some embodiments, surface 47 is a substantially axial facing surface and faces axial direction AD2. In some embodiments, surface 47 acts as a stop or seat for tube 80 thereby preventing tube 80 from being displaced in axial direction AD1 with respect to connector body 40. In some embodiments, and as shown, connector body 40 further comprises radially inward facing surface 49 which connects radially inward facing surface 48 with radially inward facing surface 56. Surface 49 acts as a stop or seat for section 130. In some embodiments, radially inward facing surface 49 is a frusto-conical surface that increases in diameter in axial direction AD1 (see FIG. 4). In some embodiments, radially inward facing surface 56 comprises a diameter that is greater than radially inward facing surface 46. In some embodiments, radially inward facing surface 56 comprises a diameter that is less than or equal to radially inward facing surface 46.

Groove 54 is arranged in radially outward facing surface 52. Groove 54 is arranged axially between end 44 and end 42. Groove 54 comprises a radially outward facing surface and two axial facing surfaces. The radially outward facing surface of groove 54 comprises a diameter that is less than the diameter of radially outward facing surface 52. In some embodiments, groove 54 is arranged axially between and spaced apart from end 44 and head 58. In some embodiments, and as shown, groove 54 is arranged immediately adjacent head 58. Groove 54 is operatively arranged to engage with flange 30 to connect retainer 20 to connector body 40.

Groove 54 comprises a width that is greater than the width of flange 30. In the partially assembled locked state, when retainer 20 is connected to connector body 40, without tube 80 properly connected or present at all, flange 30 and thus retainer 20 is displaceable in axial direction AD1 and axial direction AD2 with respect to groove 54 and thus connector body 40 (i.e., flange 30 can slide back and forth within groove 54). This provides an indication that fluid connection assembly 10 is not properly assembled. When retainer 20 is connected to connector body 40, with tube 80 properly connected, flange 30 and thus retainer 20 is not displaceable (or is not displaceable as much) in axial direction AD1 and axial direction AD2 with respect to groove 54 and thus connector body 40 (i.e., flange 30 abuts against the left surface of groove 54 as shown in FIG. 4). In some embodiments, connector body 40 comprises a metal, a polymer, and/or a ceramic.

To assemble fluid connection assembly 10, connector body 40 is connected to service valve body 100, specifically, section 130. For example, connector body 40 may be screwed onto section 130 such that threading 60 is engaged with threading 138. In some embodiments, end 132 (or its frusto-conical taper) is engaged with radially inward facing surface 49. In some embodiments, end 132 is spaced apart from radially inward facing surface 49. Tube 80 is inserted in axial direction AD1, with end 82 first, into connector body 40. Radially outward facing surface 84 engages seals 62A-B and section 83 is arranged inside of connector body 40 proximate radially inward facing surface 46. Shoulder 87 engages end 44 of connector body 40, specifically, surface 86 abuts against end 44. In some embodiments, and as shown, shoulder 87 resides completely outside of connector body 40. In some embodiments, end 82 abuts against surface 47. In some embodiments, end 82 is spaced apart from surface 47. Then, retainer 20 is secured over both connector body 40 and tube 80. Specifically, sections 20A and 20B are arranged over connector body 40 such that flange 30 is at least partially aligned with groove 54 and flange 32 is at least partially aligned with surface 88. Sections 20A and 20B are displaced radially inward toward each other (i.e., in radial direction RD2) until female connector 38 fully engages male connector 36 and retainer 20 is in the locked state. Additionally, flange 32 engages tube 80, specifically radially outward facing surface 90, thereby preventing the ingress of foreign materials into fluid connection assembly 10.

In the fully assembled locked state, flange 30 engages groove 54, radially inward facing surface 28 engages radially outward facing surface 52 and flange 32 engages shoulder 87 of tube 80. In some embodiments, in the fully assembled locked state, flange 30 abuts against the left surface of groove 54, flange 32 abuts against surface 88, and surface 86 abuts against end 44. In some embodiments, in the fully assembled locked state, flange 30 abuts against the radially outward facing surface of groove 54, thus preventing radial or circumferential displacement of retainer 20 with respect to connector body 40. In some embodiments, flange 32 engages radially outward facing surface 90. The engagement of tube 80 with connector body 40 prevents axial displacement of tube 80 in axial direction AD1 and the engagement of retainer 20 with connector body 40 and tube 80 prevents axial displacement of tube 80 in axial direction AD2, as well as radial directions RD1 and RD2, relative to connector body 40.

To disassemble, female connector 38 is displaced radially outward in radial direction RD1 with respect to male connector 36 until apertures 38A disengages projections 36B. Sections 20A and 20B are then separated to disengage flange 32 from shoulder 87, at which point tube 80 can be removed from connector body 40.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Retainer
20A Section
20B Section
21 Hole
22 End
24 End
26 Radially outward facing surface
28 Radially inward facing surface
30 Flange
32 Flange
34 Hinge
36 Male connector
36A Groove
36B Projection(s)
38 Female connector
38A Aperture(s)
38B Recess
40 Connector body
41 Through-bore
42 End
44 End
46 Radially inward facing surface
47 Axial surface or seat
48 Radially inward facing surface
49 Radially inward facing surface
50A Groove
50B Groove 52 Radially outward facing surface
54 Groove
56 Radially inward facing surface
58 Head
60 Threading
62A Seal
62B Seal
80 Tube
82 End
83 Section
84 Radially outward facing surface
86 Surface
87 Shoulder or bead
88 Surface
89 Section
90 Radially outward facing surface
92 End
94 Through-bore
100 Service valve body
102 Section or tube
104 End
106 End
108 Port or service port
110 Port or middle port
112 Threading
114 Flange
116 Hole(s)
118 Section or tube
120 End
122 End
124 Port or valve port
126 Threading
130 Section or tube
132 End
134 End
136 Port or line port
138 Threading
160 Cap
162 Cap
AD1 Axial direction
AD2 Axial direction
RD1 Radial direction
RD2 Radial direction
D1 Diameter
D2 Diameter

What is claimed is:

1. A fluid connection assembly, comprising:
a connector body, comprising:
   a first end;
   a second end;
   a through-bore;
   a first radially outward facing surface comprising an annular groove;
   a first radially inward facing surface extending from the first end; and
   a second radially inward facing surface extending from the second end; and
a retainer operatively arranged to be removably connected to the connector body, the retainer including:
   a third end;
   a fourth end;
   a first section comprising a male connector component;
   a second section displaceable with respect to the first section, the second section comprising a female connector component operatively arranged to engage the male connector component to fixedly secure the second section to the first section;
   a third radially inward facing surface;
   a first flange extending radially inward from the third radially inward facing surface and operatively arranged to engage the annular groove, the first flange comprising a first innermost diameter; and
   a second flange extending radially inward from the third radially inward facing surface, the second flange comprising a second innermost diameter, less than the first innermost diameter.

2. The fluid connection assembly as recited in claim 1, wherein the first radially inward facing surface comprises at least one annular groove.

3. The fluid connection assembly as recited in claim 2, wherein the at least one annular groove comprises:
   a first annular groove; and
   a second annular groove spaced apart in an axial direction from the first annular groove.

4. The fluid connection assembly as recited in claim 2, wherein a seal is arranged in the at least one annular groove.

5. The fluid connection assembly as recited in claim 1, wherein the second radially inward facing surface comprises threading.

6. The fluid connection assembly as recited in claim 1, wherein the connector body further comprises a fourth radially inward facing surface arranged between the first radially inward facing surface and the second radially inward facing surface, wherein a diameter of the fourth radially inward facing surface is less than both the first radially inward facing surface and the second radially inward facing surface.

7. The fluid connection assembly as recited in claim 6, wherein the connector body further comprises an axial surface connecting the first radially inward facing surface and the fourth radially inward facing surface.

8. The fluid connection assembly as recited in claim 1, wherein:
   the first flange is arranged immediately proximate the third end; and
   the second flange is arranged immediately proximate the fourth end.

9. The fluid connection assembly as recited in claim 1, further comprising a tube including a shoulder, wherein the retainer is operatively arranged to secure the tube to the connector body.

10. The fluid connection assembly as recited in claim 9, wherein in a connected state, the shoulder and the connector body are squeezed together by the retainer.

11. The fluid connection assembly as recited in claim 1, further comprising a service valve body comprising a plurality of ports, wherein the connector body is operatively arranged to be removably connected to at least one port of the plurality of ports.

12. A fluid connection assembly, comprising:
a connector body, comprising:
   a first end;
   a second end;
   a through-bore;
   a first radially outward facing surface comprising an annular groove;
   a first radially inward facing surface extending from the first end; and
   a second radially inward facing surface extending from the second end; and
a retainer operatively arranged to be removably connected to the connector body, the retainer including:
   a third end;
   a fourth end;

a second radially outward facing surface;
a third radially inward facing surface;
a first section comprising a male connector component fixedly secured to the second radially outward facing surface;
a second section displaceable with respect to the first section, the second section comprising a female connector component including a through-hole operatively arranged to engage the male connector component to fixedly secure the second section to the first section;
a first flange extending radially inward from the third radially inward facing surface and operatively arranged to engage the annular groove; and
a second flange extending radially inward from the third radially inward facing surface.

13. The fluid connection assembly as recited in claim 12, wherein:
the male connector component extends radially outward from the second radially outward facing surface; and
the second section is hingedly connected to the first section.

14. The fluid connection assembly as recited in claim 12, wherein:
the first flange is arranged immediately proximate the third end; and
the second flange is arranged immediately proximate the fourth end.

15. The fluid connection assembly as recited in claim 12, wherein:
the first flange comprises a first diameter;
the second flange comprises a second diameter; and
the first diameter is greater than the second diameter.

16. The fluid connection assembly as recited in claim 12, wherein the first radially inward facing surface comprises:
a first annular groove; and
a second annular groove spaced apart in an axial direction from the first annular groove.

17. The fluid connection assembly as recited in claim 12, wherein the second radially inward facing surface comprises threading.

18. The fluid connection assembly as recited in claim 12, wherein the connector body further comprises:
a third radially inward facing surface arranged between the first radially inward facing surface and the second radially inward facing surface, the third radially inward facing surface having a diameter that is less than a diameter of both the first radially inward facing surface and the second radially inward facing surface; and
an axial surface connecting the first radially inward facing surface and the third radially inward facing surface.

19. The fluid connection assembly as recited in claim 18, wherein the connector body comprises a head arranged at the second end.

20. A fluid connection assembly, comprising:
a connector body, comprising:
a first end;
a second end;
a through-bore;
a first radially outward facing surface comprising an annular groove;
a first radially inward facing surface extending from the first end; and
a second radially inward facing surface extending from the second end;
a retainer operatively arranged to be removably connected to the connector body, the retainer including:
a third end;
a fourth end;
a first section comprising a male connector component;
a second section displaceable with respect to the first section, the second section comprising a female connector component operatively arranged to engage the male connector component to fixedly secure the second section to the first section;
a third radially inward facing surface;
a first flange extending radially inward from the third radially inward facing surface and operatively arranged to engage the annular groove; and
a second flange extending radially inward from the third radially inward facing surface; and
a tube including a shoulder, wherein the retainer is operatively arranged to secure the tube to the connector body;
wherein in a connected state, the shoulder and the connector body are squeezed together by the retainer.

* * * * *